United States Patent Office 3,578,617
Patented May 11, 1971

3,578,617
COLD WATER-DISPERSIBLE EMULSIONS OF WATER REPELLENT COMPOSITIONS CONTAINING TRIAZINE-FORMALDEHYDE CONDENSATION PRODUCTS
Kwok Toy Louis, Wyckoff, Donald W. Wurmser, Jackson, and Herbert Zaritsky, Toms River, N.J., assignors to Ciba Corporation, Summit, N.J.
No Drawing. Filed Apr. 17, 1969, Ser. No. 817,180
Int. Cl. C08g 9/30
U.S. Cl. 260—21
9 Claims

ABSTRACT OF THE DISCLOSURE

Cold water-dispersible aqueous emulsions of water repellent compositions containing triazine-formaldehyde condensation products are provided which are comprised of the water repellent composition, a higher molecular weight polyethyleneglycol-alkylphenyl ether, a solvent for the water repellent composition which is water-immiscible, and a second solvent which is miscible with the water-immiscible solvent and soluble in water. The emulsions of this invention are especially useful for imparting water repellence to textiles.

BACKGROUND OF THE INVENTION

Field of the invention

This invention relates to cold water-dispersible emulsion of certain water repellent agents. More particularly, this invention is concerned with stable, cold water-dispersible emulsions of water repellent compositions which contain triazine formaldehyde condensation products.

Description of the prior art

Certain compositions which contain triazine-formaldehyde condensation products have proven to be highly effective water repellent agents when applied to textile materials. Compositions of this type are described in patents such as Hiestand et al., U.S. Pat. 2,927,090, which discloses as a water repellent the composition comprised of (1) a hardenable water-insoluble derivative of a methylolmelamine obtained by condensing with the aid of heat and under substantially anhydrous conditions a methylolmelamine methyl ether having at least one N-hydroxymethyl group condensed with a member selected from the group consisting of an aliphatic saturated monocarboxylic acid containing 8 to 18 carbon atoms, aliphatic saturated monohydric alcohols containing 8 to 18 carbon atoms, N-methylolamides of aliphatic saturated monocarboxylic acids containing 8 to 18 carbon atoms and N-methyl urethanes of aliphatic saturated monohydric alcohols containing 8 to 18 carbon atoms, with a partial ester of an aliphatic saturated polyhydric alcohol with an aliphatic saturated monocarboxylic acid containing 12 to 18 carbon atoms and partial ethers of an aliphatic saturated polyhydric alcohol with an aliphatic saturated monohydric alcohol containing 12 to 18 carbon atoms; (2) paraffin wax, and (3) a water-soluble salt of a ternary basic condensation product obtained by heating together a methylolmelamine methyl ether, stearic acid and triethanolamine. Of this general type, the products which have proven to be particularly valuable are obtained when the methylolmelamine methyl ether is condensed with aliphatic saturated monocarboxylic acid containing 8–18 carbon atoms. A typical water repellent composition of this type would contain, for example, (1) about 10 parts of a hardenable water-insoluble derivative of a methylolmelamine which has been obtained by condensing with the aid of heat under substantially anhydrous conditions 1 mol of a methylolmelamine ether which is esterified with 2 mols of stearic acid with 2 mols of stearic acid diglyceride; (2) about 10 parts paraffin wax, and (3) at least 18 parts of the acetate of a ternary basic condensation product obtained by heating together methylolmelamine methyl ether, stearic acid and triethanolamine.

The water repellent compositions described above are highly effective as water repellents when employed by themselves or in combinaation with additional treatments such as resin treatment to improve crease resistance. In addition, the water repellent compositions described above can advantageously be applied in combination with other types of more expensive water repellents such as the fluorocarbon repellents to both insure sufficient repellence and to lower the material cost.

The water repellent compositions of the type described above would be more widely used except for the fact that it was not heretofore possible to make stable, cold water-dispersible emulsions which were suitable for use in water repellent treatments. At room temperature the water repellent compositions described above are hard, somewhat brittle, wax-like materials. The water repellent compositions were supplied in this form to the textile finisher, who had to melt and then emulsify them before application. The resulting emulsions had to be used almost immediately because the emulsions had limited stability. The necessity of melting and then emulsifying the water repellent compositions immediately before use was heretofore not desirable but was acceptable. However, recently it has become essential to provide products to the textile industry which can be used directly as received with at best only a minimal amount of simple preparatory steps such as dilution. More precisely, the products should be easily dispersible in cold water and then be ready for immediate use. In addition, since the products may be stored for some time before being used and generally will be metered directly from shipping containers, the products must be supplied in a stable form so as to insure uniform results when using the products.

Many attempts were made to make stable, cold water-dispersible emulsions of the water repellent compositions containing the triazine-formaldehyde condensation products of the type described above without success. The emulsions that were obtained generally had a relatively short shelf life, sometimes as short as a few hours to a few days. The problem of obtaining a stable emulsion was further complicated by the fact that the amount of the emulsifiers and the type of emulsifiers that could be employed were quite limited because of the problem of obtaining a water repellent product which did not exhibit rewetting properties. If an excess of certain emulsifiers were employed a relatively stable emulsion could be obtained, but the product would lose its water repellent properties since the excess emulsifiers would counteract the desired effect of the water repellent composition and cause the fabric to wet out.

SUMMARY OF THE INVENTION

It has been found that stable, cold water-dispersible emulsions of water repellent compositions containing the triazine-formaldehyde condensation products of the type described above can be obtained by employing a higher molecular weight polyethylene-glycol-alkylphenyl ether as the emulsifier and a combination of two solvents, a hydrophobic solvent in which the composition is soluble and a second solvent which is miscible with the water-immiscible solvent and soluble in water.

DESCRIPTION OF THE PREFERRED EMBODIMENT

The emulsions of the present invention contain up to about 40% by weight of the water repellent composition described above. Slightly higher amounts of the water repellent composition can be employed; however, the ease of cold water-dispersibility somewhat decreases as the percentage is increased. It should also be appreciated that excellent emulsions containing relatively low amounts, for example, 5-10% by weight, of the water repellent composition can readily be prepared. These emulsions are quite stable and easy to disperse in cold water. However, in view of the substantial amount of dilution, the cost of shipping such emulsions is quite high. The optimum results with regard to stability, dispersibility and shipping economy is obtained with emulsions containing about 20% by weight of the water repellent composition.

The emulsifiers that are employed to make the compositions of this invention must be carefully selected. The emulsifiers must emulsify the water repellent compositions and must not impart rewetting properties to the final product. It has been found that the emulsifiers must be of relatively high molecular weight to be suitable for employment in the present invention. The polyethyleneglycol-alkylphenyl ethers which have 8-12 carbon atoms in the alkyl substituent and at least 30, and more preferably up to 50 or more, condensed ethyleneglycol groups have been found to be excellent emulsifiers for the purpose of this invention. Of this particular class, the nonylphenyls of the formula

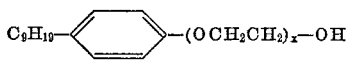

wherein $x$ is a whole number from 30-50, have proven to be especially valuable.

The relative amount of the emulsifier that is employed is dependent on the weight of the triazine-formaldehyde condensation product present in the emulsion. In general, an amount of 2-8% by weight of the condensation product is sufficient, with about 3.5% by weight giving the optimum results.

The initial requirement for the hydrophobic solvent is that the triazine-formaldehyde condensation product must be readily soluble in the solvent and must stay in solution at room temperature. The solvent, in addition, should be immiscible to at most slightly miscible with water. The hydrophobic solvents that are employed in the emulsions can be selected from several different classes. Chlorinated aliphatic hydrocarbons such as 1,2-dichloroethane and nonchlorinated aromatic hydrocarbons such as benzene, toluene and xylene are quite useful for this purpose. However, special attention is directed to the halogenated aromatic hydrocarbon represented by the formula

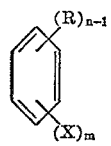

wherein R represents a lower alkyl having 1-4 carbon atoms, preferably methyl, and X represents halogen, for example, fluorine, bromine and iodine, and particularly chlorine, $n$ is a whole number from 1-4 and $m$ is a whole number from 1-3. Typical of compounds of this type are the monochlorotoluene, dichlorotoluene, monochloroxylene and dichloroxylene. The preferred solvents, however, for employment in the present invention are the chlorinated benzenes, for example, di- and trichlorobenzene, and in particular, monochlorobenzene.

The amount of the hydrophobic solvent employed is dependent on the amount of the water repellent composition in the emulsion. An amount as low as about 15% based on the weight of the water repellent is generally sufficient, with amounts up to 40% being feasible. The optimum amount is about 20% based on the weight of the water repellent composition.

The second solvent that is employed to make the emulsion of this invention is characterized by being miscible with the water-immiscible solvent described above and also being soluble in water. There are various solvents of this type which are well known to those skilled in the art. However, it has been found that the solvent of the general formula $$HO-R_1-O-R_2$$

wherein $R_1$ and $R_2$ are lower alkyl radicals having 1-4 carbon atoms are quite useful for this purpose. In particular, it should be noted that the solvent 2-ethoxyethanol, which is a member of the above-described class, is especially useful in this invention. The amount of the second solvent that is employed is related to the amount of the water repellent composition in the emulsion. An amount as low as about 15% based on the weight of the water repellent composition may be employed, with amounts up to 40% also being feasible. The optimum results are obtained with about 20% by weight based on the weight of the water repellent composition.

The emulsion of the water repellent composition is obtained by initially melting the water repellent composition and blending it with about half of the total amount of the emulsifier. A temperature of about 70-75° C. is usually quite satisfactory for this step. The hydrophobic solvent, for example, monochlorobenzene, is added and is thoroughly blended with the water repellent composition. The temperature is adjusted to about 70-75° C. and the second solvent, for example, 2-ethoxyethanol, is added with agitation. The temperature is again adjusted to about 70-75° C. The resulting blend of the water repellent agent, half the emulsifier, and the solvents is gradually added with agitation to a heated (80°-85° C.) aqueous solution containing the remainder of the emulsifier. The resulting emulsion is gradually cooled to about 40° C., at which it should become somewhat more viscous and is passed through a homogenizer several times until the product in appearance is somewhat whitened and the emulsion becomes more fluid. It should be noted that it may be necessary to cool the material being passed through the homogenizer due to the heat imparted by the homogenizing step. After the emulsion has been homogenized, it is gradually cooled to room temperature and loaded into containers for future use.

It should be appreciated that the above-noted procedure can be varied considerably and still obtain satisfactory emulsions. For example, the emulsion can, of course, be made directly from the molten water repellent composition as it is manufactured without the intermediate cooling and remelting of the composition. Furthermore, the entire amount of the emulsifier can be added to the melt, rather than one-half as indicated above. However, the results are not considered to be as satisfactory. The temperatures noted above are preferred temperatures. Higher or even lower temperatures within reason can likewise be employed.

The emulsions obtained according to this invention have a shelf life considerably in excess of three months, and the properties of the resulting water repellent treatment are not adversely affected. The emulsions can be readily poured into cold water and dispersed with a slight amount of agitation to form a uniform treating bath.

The examples below are given by way of illustration and are not intended to limit the scope of the invention. The parts indicated in the examples are parts by weight rather than parts by volume unless otherwise indicated.

EXAMPLE 1

Step I.—324 parts (1 mol) of finely pulverized hexamethylolmelamine were introduced, while stirring, at room temperature into 2000 parts by volume of methyl alcohol which contained 100 parts by volume of concentrated hydrochloric acid. After 10 minutes the methylol compound was dissolved. The solution was immediately stirred with about 160 parts of calcined sodium carbonate until it was neutral to litmus. The precipitated salt was filtered off, and the solution was evaporated under reduced pressure to a syrup. The syrup concentrated to about 99% was then filtered while hot in order to remove the residual salt.

1 part of this methylolmelamine methyl ether was heated with 1.3 parts of stearic acid under a pressure of 10–20 mm. at 180–200° C. until the acid number of the resulting methylolmelamine methyl ether product had fallen to 5–8.

81 parts of commercial stearic acid were heated to 140° C. while stirred in a closed round flask. A total of 8.11 parts of sodium carbonate of 98% strength was added in small portions while simultaneously the temperature of the melt was raised to 160–170° C. As soon as all the sodium carbonate had been consumed, which was recognizable by the cessation of the evolution of carbon dioxide, the stearic acid-sodium stearate melt was cautiously cooled to about 130° C. 14 patrs of epichlorohydrin were then slowly introduced dropwise, and then the melt was gradually reheated to 150° C. When all the epichlorohydrin had been introduced, the mixture was stirred for a further 7 hours at 140–150° C.

By withdrawing a test portion from the well-stirred melt and after taking it up in ether and agitating it with dilute acid followed by washing with distilled water, determining the acid number, it was found to have an acid number of 1–3. The hydroxyl number is 96.5 instead of 95.5 calculated for a diglyceride of commercial stearic acid having a molecular weight of 270.

Into the melt of the above-described stearic acid diglyceride cooled to 120° C. were introduced 67.6 parts of the ester obtained from highly methylated methylolmelamine and stearic acid. as described above. Under a good vacuum produced by a water jet pump the contents of the flask, which were not boiling vigorously, were heated first for 2 hours at 120° C., then in the course of 1 hour up to 160° C. and for 2 hours at 200° C.

After pouring the reaction mass onto a metal plate there was obtained a very hard and brittle product melting at 41–42° C.

Step II.—A mixture of 15 parts of triethanolamine and 90 parts of a molten ester of methylated methylolmelamine and stearic acid was heated, while stirring, under reduced pressure (10–20 mm.) at 115–120° C. until a test portion withdrawn from the reaction vessel was soluble in dilute warm acetic acid. The melt was then stirred at 70–80° C. with 7 parts of glacial acetic acid. There was obtained a yellowish wax-like mass which is soluble in dilute acetic acid.

Step III.—10 parts of the product obtained in Step I, 10 parts of paraffin wax melting at 60–62° C. and 18 parts of the product obtained in Step II were melted at about 70° C. and blended together. The resulting mixture was poured into a thin film on a metal plate and cooled to room temperature. A hard, brittle, waxy material was obtained.

EXAMPLE 2

72 g. of the final product obtained in Example 1 and 1.26 g. of nonylphenyl ether emulsifier of the formula

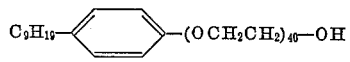

were heated until completely melted. The temperature was adjusted to 70–75° C. and 14.4 g. of monochlorobenzene were charged into the melt. The temperature was again adjusted to 70–75° C. and 14.4 g. of 2-ethoxyethanol were charged into the mixture. The resulting mixture was thoroughly mixed and the temperature again adjusted to 70–75° C.

An additional 1.26 g. of the above-noted nonylphenyl ether emulsifier was dispersed into 256 g. of water and the aqueous solution was heated to 80–85° C. The blend of the water repellent composition prepared in Example 1, the emulsifier and the solvents was added gradually with gentle agitation to the aqueous solution. The temperature of the resulting emulsion was gradually reduced to the point where it appears to thicken, which was about 40° C. The emulsion was then passed through a hand homogenizer several times. An extremely white fluid emulsion was obtained. This emulsion was gradually cooled to room temperature.

EXAMPLE 3

The procedure of Example 2 was repeated with the exception that the product of Example 1 was employed directly in the molten form with intermediate cooling and remelting. A product identical in properties to that produced in Example 2 was obtained.

EXAMPLE 4

The procedure according to Example 2 was repeated with the exception that equivalent amounts of the following solvents were used in place of the monochlorobenzene;

(a) benzene          (d) 1,2-dichloroethane
(b) toluene          (e) dichlorobenzene
(c) xylene           (f) trichlorobenzene The resulting products were essentially the same as the product obtained in Example 2. The chlorinated benzenes, however, were more effective solvents for the products of Example 1 than the nonchlorinated solvents.

EXAMPLE 5

The procedure of Example 2 was repeated with the exception that an equivalent amount of the emulsifier of the formula

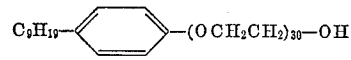

was employed in place of the emulsifier used in Example 2. The resultant product was stable but not as good an emulsion as that obtained in Example 2.

EXAMPLE 6

The procedure of Example 2 was repeated with the exception that an equivalent amount of the emulsifier of the formula

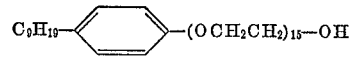

was employed in place of the emulsifier employed in Example 2. The resulting emulsion was unstable.

EXAMPLE 7

The stability of the emulsion prepared in Example 2 was evaluated at room temperature and under accelerated ageing conditions at 41.5° C. The results were as follows:

One day after manufacture.
After one week at 41.5° C. _____ Stable emulsion.
After two weeks at room temperature _. Do.
After two weeks at 41.5 C. _____ Do.
After three weeks at 41.5° C. _____ Do.
After four weeks at 41.5° C. _____ Do.
After three months at room temperature _____ Do.

All samples were cold water-dispersible.

EXAMPLE 8

An emulsion was prepared from the product produced in accordance with Example 1 by using the prior art method of melting the product and emulsifying in water as disclosed in U.S. Pat. 2,927,090. This emulsion was applied to fabrics as noted below to determine the degree of water repellence imparted to the treated fabrics.

Additional treatment baths were prepared in which the emulsion prepared in accordance with Example 2 were simply added to cold water and blended. Emulsions which were freshly prepared and emulsions which were 2 weeks and three months old were evaluated to determine the effect, if any, of ageing on the emulsions.

| Product | Age of emulsion | Water repellent composition on weight of bath, percent | Buffered Zn(NO$_3$)$_2$ catalyst | Cotton twill | | 65/35 cotton/dacron | |
|---|---|---|---|---|---|---|---|
| | | | | Initial spray rating | Spray rating after 5 domestic washes | Initial spray rating | Spray rating after 5 domestic washes |
| Blank | | | | 0 | 0 | 0 | 0 |
| Example 1 | New | 3.0 | 0.75 | 100 | 70 | 100 | 80 |
| Do | New | 4.5 | 1.2 | 100 | 80 | 100 | 80 |
| Example 2 | New | 3.0 | 0.75 | 100 | 80 | 100 | 80 |
| Do | New | 4.5 | 1.2 | 100 | 80 | 100 | 80 |
| Do | 2 weeks | 3.0 | 0.75 | 100 | 70 | 100 | 90 |
| Do | do | 4.5 | 1.2 | 100 | 80 | 100 | 90 |
| Do | 3 months | 3.0 | 0.75 | 90 | 70 | 100 | 90 |
| Do | do | 4.5 | 1.2 | 100 | 80 | 100 | 90 |

We claim:
1. A stable, cold water-dispersible aqueous emulsion comprised of:
(A) up to 40% by weight of a composition comprised of:
(1) a hardenable water-insoluble derivative of a methylolmelamine which has been obtained by condensing with the aid of heat and under substantially anhydrous conditions a methylolmelamine methyl ether in which at least one N-hydroxymethyl group is condensed with a member selected from the group consisting of aliphatic saturated monocarboxylic acids containing 8 to 18 carbon atoms, aliphatic saturated monohydric alcohols containing 8 to 18 carbon atoms, N-methylolamides of aliphatic saturated monocarboxylic acids containing 8 to 18 carbon atoms and N-methyl urethanes of aliphatic saturated monohydric alcohols containing 8 to 18 carbon atoms, with a member selected from the group consisting of partial esters of an aliphatic saturated polyhydric alcohol with an aliphatic saturated monocarboxylic acid containing 12 to 18 carbon atoms and partial ether of an aliphatic saturated polyhydric alcohol with an aliphatic saturated monohydric alcohol containing 12 to 18 carbon atoms;
(2) paraffin wax, and
(3) water-soluble salt of a ternary basic condensation product obtained by heating together a methylolmelamine methyl ether, stearic acid and triethanolamine;
(B) 2–8% by weight of said composition of a polyethyleneglycolalkylphenyl ether having 8–12 carbon atoms in the alkyl radical and 30–50 condensed ethyleneglycol groups;
(C) 15'40% by weight of the composition of a hydrophobic solvent in which said composition is soluble, and
(D) 15–40% by weight of a second solvent which is miscible with said hydrophobic solvent and soluble in water,
(E) balance water.
2. The emulsion according to claim 1 wherein said polyethyleneglycol-alkylphenyl ether is of the formula

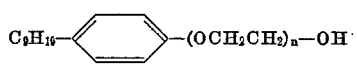

wherein $n$ is a whole number from 30–50.

3. The emulsion according to claim 1 wherein said hydrophobic solvent is represented by the formula

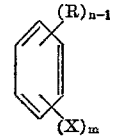

wherein R is a lower alkyl having 1–4 carbon atoms, X is halogen, $n$ is a whole number from 1–4 and $m$ is a whole number from 1–3.
4. The emulsion according to claim 1 wherein the hydrophobic solvent is chlorinated benzene having 1–3 chlorine substituents.
5. The emulsion according to claim 1 wherein said hydrophobic solvent is monochlorobenzene.
6. The emulsion according to claim 1 wherein said second solvent is represented by the formula $$HO-R_1-O-R_2$$

wherein $R_1$ and $R_2$ are the same or different and each represents a lower alkyl having 1–4 carbon atoms.
7. The emulsion according to claim 1 wherein said second solvent is 2-ethoxyethanol.
8. The emulsion according to claim 1 comprised of
(A) about 20% by weight of said composition;
(B) about 3.5% by weight of said composition of polyethyleneglycol-p-nonylphenyl ether having 30–50 condensed ethyleneglycol groups;
(C) about 20% by weight of said composition of monochlorobenzene, and
(D) about 20% by weight of said composition of 2-ethoxyethanol.
9. The method for the manufacture of the emulsion according to claim 1 which comprises melting the composition of claim 1, blending said molten composition with approximately one-half the total amount of the polyethyleneglycol-alkylphenyl ether, adding the hydrophobic solvent to the resulting molten mixture, and thereafter adding said second solvent, blending the resulting product with an aqueous mixture of the remainder of said polyethyleneglycol-alkylphenyl ether and homogenizing the aqueous blend.

References Cited
UNITED STATES PATENTS

| 2,466,632 | 4/1949 | Borus | 252—118 |
| 2,700,654 | 1/1955 | Holman | 252—118 |
| 2,927,090 | 3/1960 | Hiestand | 260—21 |
| 2,981,704 | 4/1961 | Herbes | 260—29.4 |

DONALD E. CZAJA, Primary Examiner

E. C. RZUCIDLO, Assistant Examiner

U.S. Cl. X.R.

117—135.5; 260—18R, 28, 29.4R, 33.2R, 33.8R